(12) United States Patent
Pusateri

(10) Patent No.: US 7,794,355 B2
(45) Date of Patent: Sep. 14, 2010

(54) PLANETARY GEAR SET CENTERING RING

(75) Inventor: Daniel S. Pusateri, Grayslake, IL (US)

(73) Assignee: Snap-on Incorporated, Kenosha, WI (US)

( * ) Notice: Subject to any disclaimer, the term of this patent is extended or adjusted under 35 U.S.C. 154(b) by 435 days.

(21) Appl. No.: 11/748,949

(22) Filed: May 15, 2007

(65) Prior Publication Data

US 2008/0287247 A1 Nov. 20, 2008

(51) Int. Cl.
- *F16H 57/08* (2006.01)
- *E21B 3/00* (2006.01)
- *E21B 17/22* (2006.01)
- *E21B 19/16* (2006.01)
- *E21B 19/18* (2006.01)
- *B25B 17/00* (2006.01)

(52) U.S. Cl. ............................. 475/331; 173/216; 81/57
(58) Field of Classification Search ................ 475/298, 475/331, 269; 173/140, 217, 216; 81/57.11, 81/57

See application file for complete search history.

(56) References Cited

U.S. PATENT DOCUMENTS

| | | | |
|---|---|---|---|
| 2,732,139 A * | 1/1956 | Shaff | 242/439.3 |
| 3,161,241 A * | 12/1964 | Allen et al. | 173/14 |
| 3,584,634 A | 6/1971 | Jagdmann | |
| 3,667,324 A | 6/1972 | Laing | |
| 3,756,095 A | 9/1973 | McCay, Jr. et al. | |
| 3,937,541 A | 2/1976 | Alling et al. | |
| 4,042,285 A | 8/1977 | Dorsch | |
| 4,104,933 A | 8/1978 | Campbell | |
| 4,447,749 A | 5/1984 | Reeb, Jr. et al. | |
| 4,776,237 A | 10/1988 | Primiski et al. | |
| 4,885,959 A | 12/1989 | Shinjo et al. | |
| 4,901,601 A | 2/1990 | Leggat | |
| 4,998,909 A | 3/1991 | Fuehrer | |
| 5,269,733 A | 12/1993 | Anthony, III | |
| 5,292,292 A | 3/1994 | Heinrich et al. | |
| 5,370,590 A | 12/1994 | Premiski et al. | |
| 5,470,286 A | 11/1995 | Fan | |
| 5,480,362 A | 1/1996 | Tanaka et al. | |
| 5,700,218 A | 12/1997 | VanSelous et al. | |
| 5,727,430 A | 3/1998 | Valente | |
| 5,728,025 A | 3/1998 | Ishikawa et al. | |
| 5,795,258 A | 8/1998 | Faass et al. | |
| 5,839,985 A | 11/1998 | Teraoka | |
| 5,853,052 A | 12/1998 | Baiden | |
| 5,853,346 A | 12/1998 | Gaffney | |
| 5,893,507 A | 4/1999 | Ding et al. | |
| 5,928,105 A | 7/1999 | Taha et al. | |
| 6,010,426 A * | 1/2000 | Nakamura | 477/22 |
| 6,106,429 A | 8/2000 | Mortensen | |
| 6,561,945 B2 | 5/2003 | Shattuck et al. | |

(Continued)

OTHER PUBLICATIONS

International Search Report issued in application No. PCT/US08/63575 (2008).

*Primary Examiner*—Tisha D Lewis
(74) *Attorney, Agent, or Firm*—Barnes & Thornburg LLP

(57) ABSTRACT

A planetary gear set centering ring for use is a planetary gear train. The planetary gear centering ring is adapted to be positioned within a gear train to center a planetary gear carrier and a set of planetary gears within a ring gear of the gear train.

15 Claims, 2 Drawing Sheets

U.S. PATENT DOCUMENTS

| | | |
|---|---|---|
| 6,702,711 B2 | 3/2004 | Zelikov et al. |
| 6,733,414 B2 | 5/2004 | Elger |
| 7,159,671 B2 * | 1/2007 | Soderlund ................... 173/217 |
| 2006/0068968 A1 | 3/2006 | Eisenhardt |

* cited by examiner

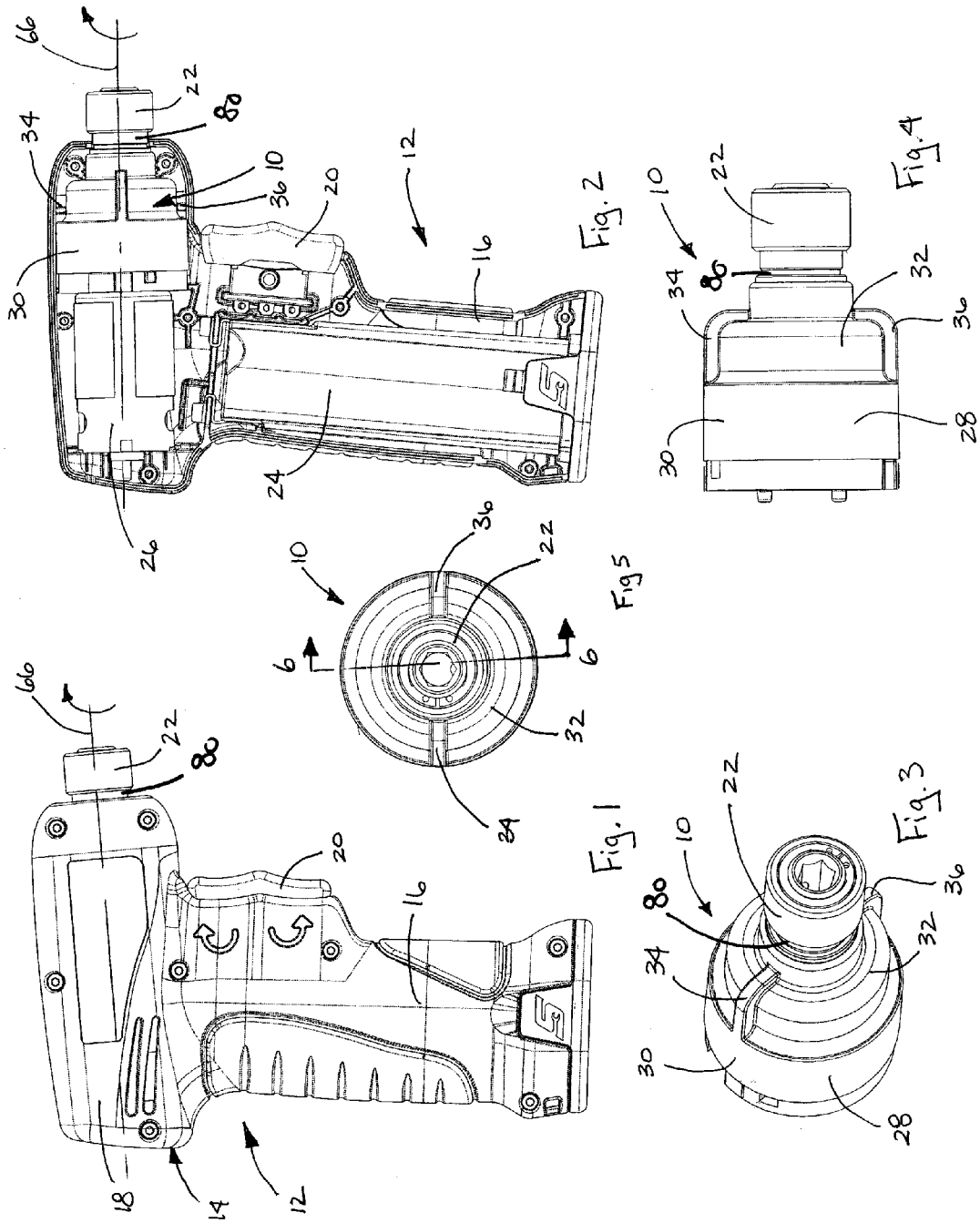

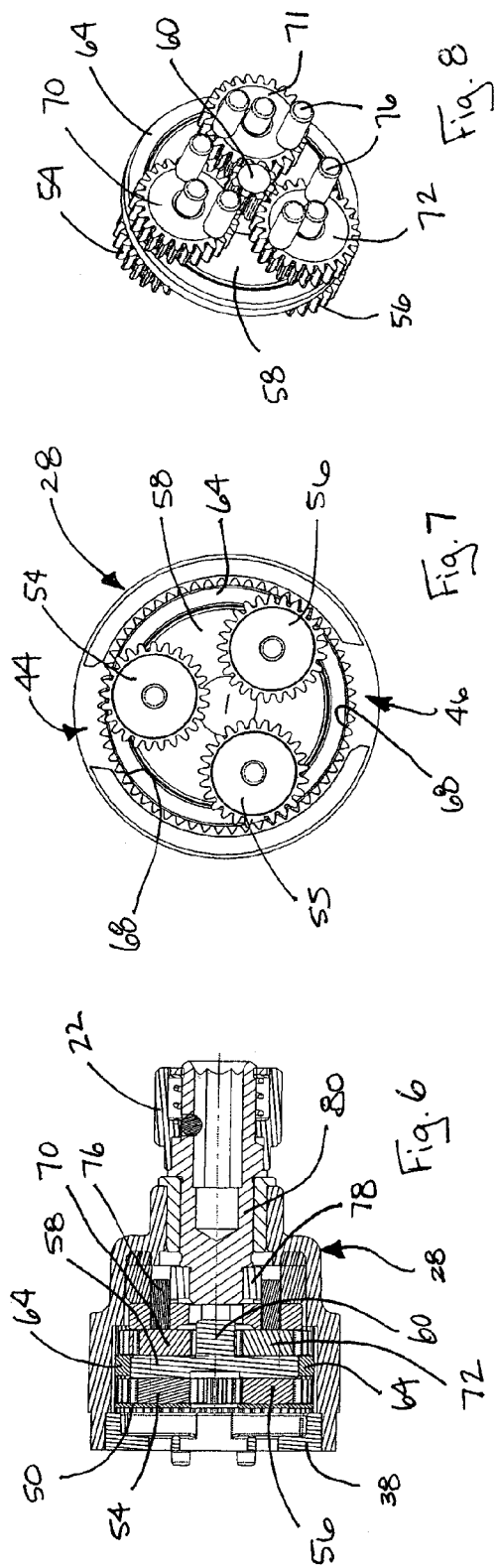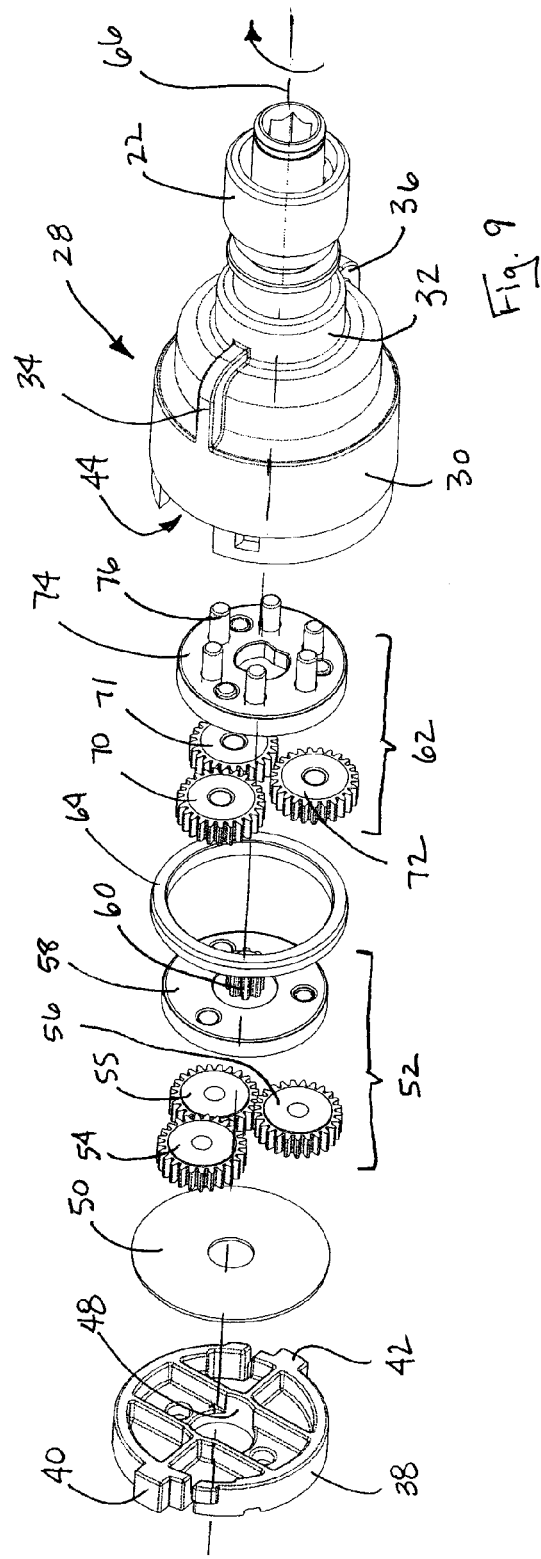

PLANETARY GEAR SET CENTERING RING

BACKGROUND

The present disclosure relates to rotary power tools, by way of example and not limitation, to a cordless driver used to install fasteners. More particularly, the present disclosure relates to a planetary gear train for use in power tools.

In accordance with the present disclosure, a planetary gear train is provided for use within a power tool, such as a cordless screwdriver. The planetary gear train comprises a ring gear housing adapted to be coupled to an output shaft designed to accept driver bits. The planetary gear train also includes a series of planetary gears pivotally coupled to a planetary gear carrier that is positioned within the ring gear housing. Rotation of a sun gear coupled to an electric motor rotates the planetary gears, which, in turn, rotates a first gear carrier.

In illustrative embodiments, the planetary gear train includes a centering ring positioned within the ring gear housing. The planetary gear carrier is adapted to be positioned within the centering ring. The centering ring is adapted to prevent the planetary gear carrier from shifting in a direction that is perpendicular to the axis of rotation of the gear train when an excessive amount of torque is applied to the output shaft of the power tool. During normal usage, the centering ring is designed to move freely or float within the ring gear to reduce driveline friction. In portable power tools where gear trains might be made from plastics material, the centering ring prevents distortion of the ring gear and the planetary gear carrier to minimize the amount of torque applied to individual gear teeth caused by gear train offset.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The present invention and the advantages thereof will become more apparent upon consideration of the following detailed description when taken in conjunction with the accompanying drawings of which:

FIG. 1 is a side elevational view of a cordless power tool showing a generally vertical handle having an actuation trigger and a generally horizontally disposed power head coupled to the handle and having an output shaft extending from one end of the power head;

FIG. 2 is a side elevational view of the power tool with a cover removed to show a generally vertically extending battery positioned within the handle and an electric motor coupled to a planetary gear train, which, in turn, is coupled to an output chuck;

FIG. 3 is a perspective view of the planetary gear train coupled to the output chuck of the power tool removed from the power tool;

FIG. 4 is a side elevational view of the planetary gear train and output chuck of the power tool, as shown in FIG. 3;

FIG. 5 is a front view of the planetary gear train and output chuck of the power tool, as shown in FIGS. 3 and 4;

FIG. 6 is a cross sectional view taken along line 6-6 of the FIG. 5 showing first and secondary planetary gear sets positioned within the ring gear housing and coupled to the output shaft and output chuck of the power tool;

FIG. 7 is a rear view of the planetary gear train showing three planetary gears positioned within the ring gear housing and coupled to a first planetary gear carrier, the first planetary carrier positioned to lie near the centering ring that is positioned between the first planetary gear carrier and the ring gear housing;

FIG. 8 is a perspective view of a set of planetary gears coupled to the first planetary gear carrier wherein the centering ring is positioned around the perimeter of the planetary gear carrier; and FIG. 9 is an exploded view of the planetary gear set showing a motor adaptor at the left followed by a spacer plate, three planetary gears and also showing a first planetary gear carrier, a centering ring, and a second set of planetary gears that are coupled to a secondary planetary gear carrier and further showing the ring gear housing coupled to the output chuck of the power tool.

DETAILED DESCRIPTION

While the present disclosure may be susceptible to embodiments in different forms, they are shown on the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

A planetary gear train 10 is adapted for use in a cordless power tool 12, as shown, for example, in FIGS. 1 and 2 by way of example and not limitation. While a cordless power tool is shown, it is contemplated that planetary gear train 10 can be used in other rotary tools. Cordless power tool 12 includes a housing 14 having a vertically oriented handle 16 and a horizontally oriented power head 18. Handle 16 includes a trigger 20 that is used to operate the power tool 12. Power tool 12 also includes an output chuck 22 coupled to power head 18.

Power tool 12 includes a battery 24 positioned within handle 16 and an electric motor 26, as shown, for example, in FIGS. 1 and 2. Electric motor 26 is one means for driving the power tool and other means could also be used including pneumatic. Electric motor 26 is positioned within power head 18 and is electrically connected to trigger switch 22 and battery 24. Electric motor 26 is coupled to planetary gear train 10 that is used to drive output chuck 22. Planetary gear train 10 includes a ring gear housing 28, as shown, for example, in FIG. 3.

Ring gear housing 28 includes a cylindrical portion 30 and a tapered region 32 extending from cylindrical portion 30, as shown, for example, in FIGS. 3 and 4. Tapered region includes first and second flanges 34, 36 that are adapted to engage housing 14 of power tool 12 to prevent rotation of ring gear housing 28 within housing 14 of power tool 12. Tapered region 32 is positioned to lie near output chuck 22 of power tool 12. Positioned on the inside of ring gear housing 28 are gear teeth 68, as shown, for example, in FIG. 7. The tips of gear teeth 68 form the inner diameter of ring gear housing 28.

Planetary gear train 10 includes a mounting plate 38 that forms the rear portion of ring gear housing 28, as shown, for example, in FIGS. 6 and 9. Mounting plate 38 is adapted to be mounted to electric motor 26. Mounting plate 38 includes a pair of flanges 40, 42 that are adapted to be positioned within first and second recesses 44, 46 of ring gear housing 28. Mounting plate 38 also includes a central aperture 48 that is adapted to permit the passage of a pinion gear from electric motor 26. Positioned in front of mounting plate 38 is spacer 50.

In front of spacer 50 is a first planetary gear set 52, as shown, for example, in FIG. 9. First planetary gear set 52 includes planetary gears 54-56 that are adapted to be coupled to a first planetary gear carrier 58. Planetary gears 54-56 can be made from nylon or other plastics materials, composites or alloys. First planetary gear carrier 58 is adapted to be coupled to planetary gears 54-56.

First planetary gear carrier 58 also includes pinion gear 60 that is adapted to drive secondary planetary gear set 62, as shown, for example, in FIGS. 6 and 9. Planetary gear train 10 also includes a centering ring 64 positioned within ring gear housing 28. Centering ring 64 includes an external diameter that is less that the internal diameter of ring gear housing 28 to allow centering ring 64 to rotate freely within the ring gear housing 28 during use of power tool 12. First planetary gear carrier 58 is adapted to be positioned within centering ring 64 and includes an outer diameter that is less than the inner diameter of centering ring 64.

Centering ring 64 is a ring that is adapted to be positioned between ring gear housing 28 and first planetary gear carrier 58. Centering ring 64 can be made from steel, aluminum, or other metals that are rigid, which could also include non-metal materials, such as carbon fiber and ceramics. The purpose of centering ring 64 is to keep first planetary gear carrier 58 centered within ring gear housing 28 even if a large torque load is applied to first planetary gear carrier 58. By way of example but not limitation, large torque loads may be applied to the first planetary gear carrier 58 for example if a user of power tool 12 manually twists handle 16 about the axis of rotation 66 of gear train 10 to tighten a fastener.

Without centering ring 64, excessive torque loads applied to gear train 10 would cause first planetary gear carrier 58 and planetary gears 54-56 to shift perpendicular to the axis of rotation 66 of gear train 10. Movement of planetary gear carrier 58 and planetary gears 54-56 in a perpendicular direction causes additional force to be applied to certain teeth of planetary gears 54-56, which can cause breakage of teeth from planetary gears 54-56. Under normal power tool usage, centering ring 64 is adapted to move freely or float between ring gear housing 28 and first planetary gear carrier 58. Allowing centering ring 64 to float between ring gear housing 28 and first planetary gear carrier 58 reduces driveline friction during operation of power tool 12.

Centering ring 64 can also be used to correct a ring gear housing 28 that is molded out-of-round. Positioning a round metal centering ring 64 within an out-of-round ring gear housing 28 forces ring gear housing 28 into the desired round shape. Under these conditions, centering ring 64 engages the inner diameter of ring gear housing 28 and does not move freely. First planetary gear carrier 58 would still positioned within centering ring 64 and rotates within inner diameter of centering ring 64.

Pinion gear 60 of first planetary gear carrier 58 is adapted to engage second planetary gears 70-72 of second planetary gear set 62, as shown, for example, in FIGS. 6 and 9. Second planetary gears 70-72 engage gear teeth 68 of ring gear housing 28 and are coupled to second planetary gear carrier 74. Pinion gear 60 of first planetary gear carrier 58 drives planetary gears 70-72, which, in turn, drive second planetary gear carrier 74.

Secondary gear carrier 58 of secondary planetary gear set 62 includes a series of outwardly extending posts 76 that are adapted to engage and drive collar 78, as shown, for example, in FIG. 6. Collar 78 is coupled to output shaft 80. Output shaft 80 extends from ring gear housing 28 and is formed to include output chuck 22. Output chuck 22 is adapted to accept a screwdriver bit or socket to install a fastener.

The present arrangement is a double gear reduction type because planetary gear train 10 includes first and second planetary gear sets 58, 62. Double reduction gear sets effectively multiply the torque output created by electric motor 26 to provide for a greater amount of torque at output shaft 80 and output chuck 22. It is contemplated that a second centering ring can be used to maintain the position of second planetary gear carrier 74 within ring gear housing 28 to prevent damage to the teeth of planetary gears 70-72. It is also contemplated that a single planetary gear set and centering ring can be used in situations where the torque multiplication of a second planetary gear set is not required.

In use, the operator of power tool 12 pulls trigger 20 to allow electricity stored in battery 24 to energize electric motor 26. Energizing electric motor 26 causes a pinion gear mounted on the output shaft of motor 26 to rotate planetary gears 54-56 about gear teeth 68 of ring gear housing 28. Rotation of planetary gears 54-56 cause rotation of first planetary gear carrier 58 within centering ring 64. Rotation of first planetary gear carrier 58 causes rotation of pinion gear 60. Rotation of pinion gear 60 causes rotation of planetary gears 70-72 about gear teeth 68 of ring gear housing 28.

Rotation of planetary gears 70-72 causes rotation of secondary planetary gear carrier 74. Rotation of secondary planetary gear carrier 74 causes rotation of collar 78 and output shaft 80 and output chuck 22. If the maximum torque of output shaft 22 is exceeded when installing a fastener, the user may grab and forcibly rotate handle 16 about the axis of rotation 66 of power head 18 to completely install the fastener. Such a situation maybe more likely to arise when battery 24 is low on power.

The excessive amount of torque applied to output shaft 80 by forcibly rotating handle 16 about the axis of rotation 66 causes a reverse torque load to be transmitted backward through second and first planetary gear sets 62, 58, causing first planetary gear carrier 58 to be forced in a direction that is perpendicular to the axis of rotation 66 of gear train 10. When a reverse torque load occurs, centering ring 64 engages the inner diameter of ring gear housing 28 and outer diameter of first planetary gear carrier 58 to prevent or minimize perpendicular movement of first planetary gear carrier 58 and planetary gears 54-56. By maintaining the orientation of first planetary gear carrier 58 within ring gear housing 28 stress loads applied to individual gear teeth of planetary gears 54-56 is minimized.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A planetary gear train for a power tool having an output shaft, the planetary gear train comprising:

a ring gear having an inner diameter and gear teeth disposed on an inside surface of the ring gear;

a planetary centering ring positioned within the ring gear, the planetary centering ring having an inner diameter and an outer diameter that is less than the inner diameter of the ring gear;

a set of planetary gears positioned within the ring gear, the planetary gears engage the gear teeth of the ring gear;

a planetary gear carrier is positioned within the planetary centering ring and coupled to the planetary gears, the planetary gear carrier having an outer diameter that is less than the inner diameter of the planetary centering ring; and the planetary gear carrier moves within the centering ring when the planetary gears are driven to rotate the planetary gear carrier and is limited from shifting perpendicularly to the axis of rotation when a reverse torque load is applied to the output shaft of the power tool.

2. The planetary gear train of claim 1, wherein the planetary centering ring is generally rigid and the ring gear is made from a plastics material.

3. The planetary gear train of claim 2, wherein the planetary centering ring moves freely between the inner diameter of the ring gear and the outer diameter of the planetary gear carrier.

4. The planetary gear train of claim 3, wherein the gear train includes a second set of planetary gears driven by the planetary gear carrier.

5. The planetary gear train of claim 4, further including a second planetary gear carrier that is coupled to the second set of planetary gears.

6. A rotary power tool comprising:
a housing;
an output shaft extending from the housing;
a battery positioned within the housing;
an electric motor positioned within the housing and electrically coupled to the battery;
a ring gear having an inner diameter and gear teeth disposed on an inside surface;
a centering ring positioned within the ring gear, the centering ring having an inner diameter and an outer diameter that is less than the inner diameter of the ring gear;
a set of planetary gears positioned within the ring gear and driven by the electric motor, the planetary gears engage the gear teeth of the ring gear;
a planetary gear carrier positioned within the centering ring and coupled to the planetary gears, the planetary gear carrier having an outer diameter that is less than the inner diameter of the planetary centering ring; and the planetary gear carrier moves within the centering ring when the planetary gears are driven by the electric motor, the centering ring limits the planetary gear carrier from shifting perpendicularly to the axis of rotation when a reverse torque load is applied to the output shaft of the power tool.

7. The rotary power tool of claim 6, wherein the centering ring is generally rigid and the ring gear is made from a plastics material.

8. The rotary power tool of claim 7, wherein the centering ring is positioned between the inner diameter of the ring gear and the outer diameter of the planetary gear carrier.

9. The rotary power tool of claim 8, wherein the gear train includes a second set of planetary gears driven by the planetary gear carrier.

10. The rotary planetary gear train of claim 9, further including a second planetary gear carrier that is coupled to the second set of planetary gears.

11. A cordless driver gear train comprising:
a housing having an inner diameter, the housing including a plurality of gear teeth formed on the inside of the housing;
a metallic centering ring positioned within the housing;
a planetary gear carrier positioned within the centering ring, the planetary gear carrier rotatable within the centering ring;
a set of planetary gears coupled to the planetary gear carrier, the planetary gears engage the gear teeth of the housing and are positioned to lie near the centering ring; and
the centering ring limits the planetary gear carrier from shifting perpendicularly to the axis of rotation of the gear train when torque is applied to the planetary gear carrier by a reverse torque load applied to the cordless driver.

12. The cordless driver gear train of claim 11, wherein the centering ring moves freely between the inner diameter of the housing and the outer diameter of the planetary gear carrier.

13. The cordless driver gear train of claim 12, further including a second set of planetary gears positioned with the housing and driven by the planetary gear carrier.

14. The cordless driver gear train of claim 13, further including a second planetary gear carrier that is coupled to the second set of planetary gears.

15. The cordless driver gear train of claim 14, further including an output shaft driven by the second planetary gear carrier.

* * * * *